United States Patent [19]
Shiota et al.

[11] Patent Number: 6,064,427
[45] Date of Patent: May 16, 2000

[54] METHOD AND SYSTEM FOR STORING PICTURE IMAGE DATA FOR REPRINT

[75] Inventors: Kazuo Shiota, Tokyo; Shuichi Ohtsuka; Nobuyoshi Nakajima, both of Kanagawa-ken; Norihisa Haneda, Saitama-ken; Sugio Makishima, Saitama-ken; Hiroshi Tanaka, Saitama-ken, all of Japan

[73] Assignee: Fuji Photo Film Co., Ltd., Kanagawa-ken, Japan

[21] Appl. No.: 08/979,111

[22] Filed: Nov. 26, 1997

[30] Foreign Application Priority Data

Nov. 27, 1996 [JP] Japan ..................................... 8-316700
Mar. 12, 1997 [JP] Japan ..................................... 9-057217

[51] Int. Cl.⁷ .............................. H04N 7/18; H04N 5/253
[52] U.S. Cl. .............................................. 348/96; 382/299
[58] Field of Search ............................. 348/96; 382/299; H04N 7/18, 5/253

[56] References Cited

U.S. PATENT DOCUMENTS

| 4,251,156 | 2/1981 | Zimmermann et al. | ................... 355/41 |
|---|---|---|---|
| 4,951,086 | 8/1990 | Hicks | ......................................... 355/41 |
| 5,293,432 | 3/1994 | Gonser | ..................................... 382/299 |
| 5,872,591 | 2/1999 | True | ......................................... 348/96 |

FOREIGN PATENT DOCUMENTS

| 0601364 | 6/1994 | European Pat. Off. . |
|---|---|---|
| 0615154 | 9/1994 | European Pat. Off. . |
| 0727693 | 8/1996 | European Pat. Off. . |

*Primary Examiner*—Howard Britton

[57] ABSTRACT

When a reprint of a picture which has been printed once and stored as picture image data is requested under a different condition, the reprint can be generated without carrying out rereading of a film. When film reading for generating a print is carried out, as much information showing the content of the picture image is recorded on the film as possible. This includes information which is not necessary for generating the requested print. It is stored as a portion of the picture image data. In this manner, even when a reprint under a condition different from the previous printing is requested, the print can be generated by reading necessary content from the stored picture image data.

29 Claims, 2 Drawing Sheets

METHOD AND SYSTEM FOR STORING PICTURE IMAGE DATA FOR REPRINT

BACKGROUND OF THE INVENTION

1. Field of the Invention

The present invention relates to a method and a system for storing picture image data for a reprint whereby picture image data read from a film for generating a picture print are stored in order to be used for a reprint thereof.

2. Description of the Related Art

A photo finishing system has been known which obtains picture image data by reading a picture image recorded on a developed film by using a film scanner and outputs the picture image as a picture print after predetermined image processing has been carried out thereon.

For such a system, a method has been proposed whereby the picture image data, which are actually output as a print after the image processing thereon, are stored in a disc of a server computer installed in a DPE or a laboratory, or in a medium such as an MO disc or a ZIP disc. A reprint of the picture image data is immediately generated by using the stored picture image data without carrying out rereading of the film or the image processing.

A film reading operation for reprints is generally inefficient compared with the case of first prints. This is because all frames recorded on a film are sequentially read in the case of first prints while only ordered frames should be selected and read in the case of reprints. Especially, when a 35 mm film is read, since the film is stored after being cut into pieces, setting the film or selecting a frame therein is time-consuming. Therefore, it is very advantageous in terms of operation efficiency if the picture image data stored in the manner described above can be used for a reprint.

The above method for storing the picture image data which have been printed is efficient when a reprint that is the same as the print which has been previously generated is generated, as in the case of an extra print. However, when a reprint under different conditions is requested, rereading of the film should be carried out, and the advantage described above cannot be obtained. Specific cases where reprints under different conditions are requested are explained below.

A first is the case where a reprint of a different area of a picture image is necessary. In general print generating processing, a print is output by reading an area which is slightly smaller than the area of the actual picture image so that a portion outside the picture image on a film is not printed as a black line at the edge of a picture. Especially, in a laboratory where production efficiency is emphasized, the area to be read is set to be rather smaller than the actual picture image area so that an error in film feeding or the like can be allowed to some degree. Therefore, it can happen that a person who takes a position in a picture at an end of a group of people is not printed, although this is rare. In the conventional method, since only the picture image data representing the area having been printed are stored, film rereading should be carried out after adjusting the area to be read so that the person is printed.

Furthermore, a reprint may be requested, because areas in bright sunlight have come out too bright or washed out, or areas in shade or high density areas have come out too dark or become somewhat flat. In such a case, the picture image data having been stored are the image-processed data after a density control has been carried out thereon. Therefore, information regarding the density range of the area causing the problem has not been stored. In other words, the area causing the problem will never be reproduced as a portion of a print unless film rereading is carried out.

Moreover, a reprint at a different resolution may be requested. If a reprint at a resolution lower than the resolution of stored picture image data is requested, the number of pixels in the picture image data only has to be reduced. However, if a reprint at a higher resolution is requested, deterioration in picture quality to some extent cannot be avoided, even though interpolation processing or the like is carried out on the image data. Therefore, film rereading is necessary to obtain a high quality print.

SUMMARY OF THE INVENTION

Based on consideration of the problems described above, an object of the present invention is to provide a method and a system for storing picture image data for a reprint, whereby a reprint can be generated from picture image data having been stored, without carrying out film rereading, even when a reprint under a different condition is requested.

A first method of the present invention for storing picture image data for a reprint comprises the steps of obtaining picture image data representing a picture image recorded on a developed film by reading an image reading area including almost the entire area of the picture image on the film, and generating a picture print by using the picture image data with a predetermined area of the picture image smaller than the image reading area having been read being specified as a print image area, while storing the picture image data in a predetermined recording medium so that the picture image data can be used for a reprint thereof. On this occasion, when a reprint is generated, it is preferable that tag information showing the print image area of the picture image is stored with the picture image data so that the print image area can be recognized (for example, it can be displayed on a monitor).

The "image reading area including almost the entire area of the picture image" means either an area almost the same as the picture image or a larger area including the outside of the picture image. Therefore, the "picture image data representing a picture image" does not mean the data representing only the picture image, but the data representing at least the picture image, and sometimes including a portion outside the picture image.

"Generating a picture print by using the picture image data with a predetermined area of the picture image smaller than the image reading area having been read being as a print image area" means that an area larger than the area necessary for generating a print is read and the data thus obtained are stored for a reprint.

"The predetermined recording medium" means a disc of a server computer installed in a DPE or the like, or a medium to be provided to a customer, such as an MO disc.

A second method of the present invention for storing picture image data for a reprint comprises the steps of obtaining picture image data representing a picture image recorded on a film by reading the picture image on the film with an input density range including almost the entire density range of the picture image, and generating a picture print by using the picture image data with a predetermined density range narrower than the input density range being specified as a print density range, while storing the picture image data in a predetermined recording medium as the picture image data to be used for a reprint. On this occasion, it is preferable that tag information showing the print density range is stored in the recording medium together with the picture image data.

"Reading the picture image with an input density range including almost the entire density range of the picture image" means that reading is carried out in such a manner that a density curve of the picture image data versus the film density will not saturate and maintain a closely linear relationship within the density range of the picture image.

"Generating a picture print by using the picture image data with a print density range narrower than the input density range" means that even a portion of picture image data in such a density range where the density curve is saturated upon printing and a print will not be generated clearly are saved and stored for a reprint.

A third method of the present invention for storing picture image data for a reprint comprises the steps of obtaining picture image data representing a picture image recorded on a developed film by reading the picture image at a predetermined resolution, and generating a picture print by using the picture image data at a resolution lower than the predetermined resolution, while storing the picture image data in a predetermined recording medium in order to be used for a reprint of the picture image. On this occasion, when a reprint is generated, it is preferable that tag information showing the resolution of the picture image to be printed at is stored in the recording medium together with the picture image data so that the resolution to be printed at can be recognized. Furthermore, at least one set of picture image data classified by resolution wherein the picture image data are represented at a resolution lower than the predetermined resolution may also be stored in the recording medium together with the picture image data.

To meet as wide a variety of requests for reprints as possible, the higher the "predetermined resolution" is at reading, the more preferable it is. Furthermore, as "at least one set of picture image data classified by resolution", it is preferable that the picture image data are stored at resolutions frequently used for ordinary printing or display such as Base *8 or 4, while the resolution of reading is Base* 16.

A first system of the present invention for storing picture image data for a reprint comprises image reading means, a picture printer, and storing means, all of which carry out processing according to the first method described above. Likewise, second and third systems of the present invention for storing picture image data for a reprint respectively comprise image reading means, a picture printer, and storing means, all of which respectively carry out processing according to the second and the third methods described above.

It is needless to say that a combination of any two methods among the above three methods, or a combination of all three methods, is also possible.

According to the methods and the systems of the present invention for storing picture image data for a reprint, when film reading for generating a print is carried out, as much as possible of the information regarding the content or the density of a picture image recorded on a film is stored as a portion of the picture image data as much, including the information which is not necessary for generating the print. Therefore, even when a reprint under a condition different from the previous condition is requested, the reprint can be generated by using the stored picture image data, without carrying out rereading of the film.

In this manner, not only does the operation efficiency upon reprinting obviously improve, but also deterioration of film quality due to repetitive reading can be avoided. Furthermore, if all information which can be obtained by film reading is stored at the time of the reading, a reprint under an arbitrary condition can be generated, even if the film is lost (or disposed of).

Moreover, if the print image area, the print density range, and the print resolution of the picture print which has been generated are stored as the tag information added to the image data, such tag information can be displayed, upon generating a reprint, on a monitor or the like as a frame or the like showing the print image area. Therefore, a variety of printing conditions can be adjusted by referring to such information.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Hereinafter, a method and a system of the present invention for storing picture image data for a reprint will be explained referring to the accompanying drawings. The present invention mainly relates to picture image data which are dealt with and stored by a photo finishing system. Basic functions of each means comprising the system, for example, in the case of a film scanner, the basic function whereby scanning is carried out after setting a reading condition which is determined by carrying out a pre-scan or the like at each frame upon necessity while a film is automatically being fed, may be the same as in a conventional photo finishing system. Therefore, detailed explanation and drawings regarding such basic functions are omitted in the following explanation.

Figure 1:
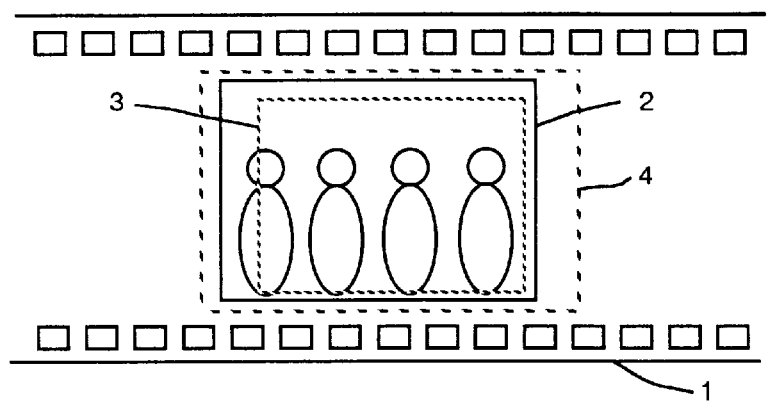
FIG. 1 is a diagram showing an outline of a first method of the present invention for storing picture image data for a reprint.

FIG. 1 shows an outline of a first method of the present invention for storing picture image data. As shown by FIG. 1, in the method and the system of the present invention, when a picture print of a picture image recorded on a film 1 is generated, an image area 2 of the picture image is detected by a predetermined image area detecting device, and reading of the film 1 is carried out with image area to be read being sufficiently larger than the detected image area 2, as shown by image reading area 4, for example. The obtained picture image data are then stored as picture image data for a reprint. It is preferable that the image reading area 4 is set to extend especially in the direction of film feeding to prevent a portion of the picture image 2 from becoming out of the image reading area due to errors in image area detection and film feeding. Moreover, print image area 3 is determined in response to the output from the image detecting device, and the image data within this area are printed by a picture printer.

The determined print image area 3 is added to the picture image data as tag information in the form of coordinates relative to the picture image 2 or the image reading area 4, and stored with the picture image data. In this manner, as shown in FIG. 2 for example, it becomes possible to display a frame showing the print image area on a monitor by using the tag information, when the stored picture image data are displayed.

Figure 2:
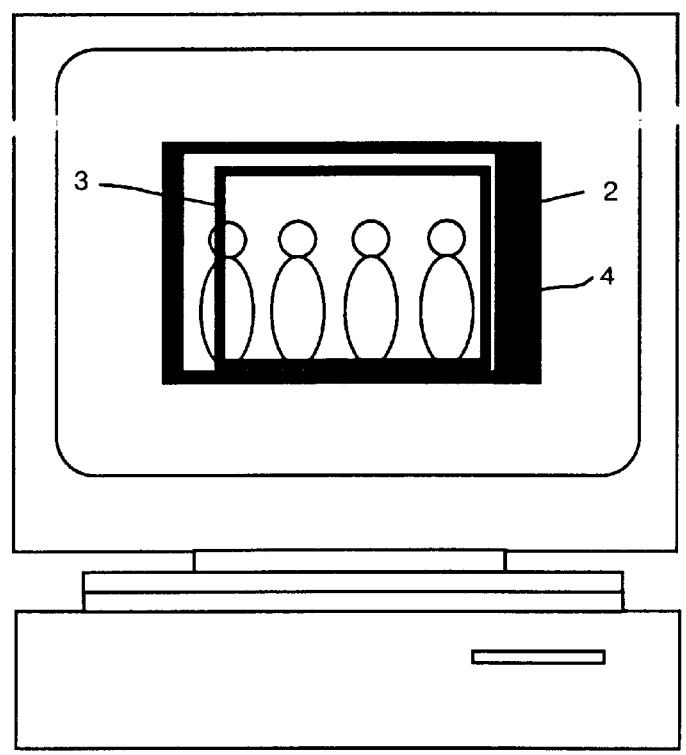
FIG. 2 is a diagram showing an example of picture image data to be stored.

As shown in FIGS. 1 and 2 for example, when a portion of a figure at the end of a picture is not printed, print output is instructed after adjusting the print image area, referring to the frame on the monitor. The information regarding the area instructed on the monitor is transferred to the picture printer, and the picture printer carries out reprinting with the instructed area being the print image area. In other words, in a conventional method and system, the area of the image data to be stored is the same as the print image area 3, and the figure at the end of the picture will not be included in a print unless film rereading is carried out. However, in the present system, a reprint can be generated immediately after an adjustment on a monitor, and production efficiency will definitely improve.

More specifically, in the APS, image data used for a first print have 1890×1074 pixels for an H size print, while there are 1524×1074 pixels for a C size print which is shorter in the horizontal direction than the H size, and 1890×672 pixels for a P size print which is shorter in the vertical direction than the H size. A conventional method stores the same number of pixels. Meanwhile, the storing method of the present invention stores the number of pixels equivalent to that of an H size picture (1890×1074 pixels) for each size. Alternatively, an area slightly larger than the area represented by the above number of pixels is stored as the picture image data, based on consideration of an error in film feeding or the like. As a result, especially in a C size or a P size print, the area to be printed can be adjusted to a large extent on the monitor, and a reprint can be generated immediately.

Figure 3:
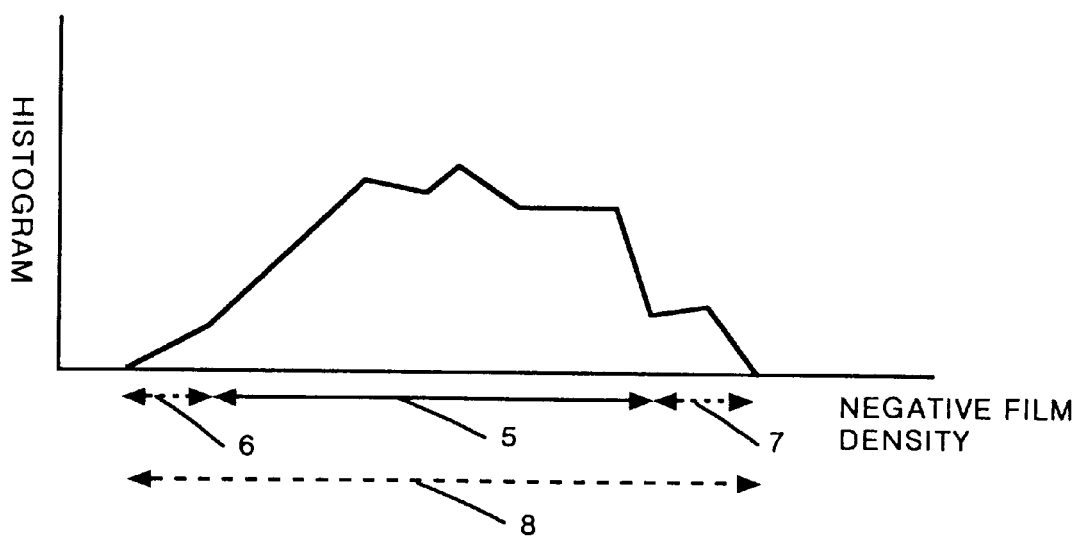
FIG. 3 is a diagram showing an outline of a second method of the present invention for storing picture image data for a reprint.

A second method of the present invention for storing picture image data for a reprint will be explained referring to FIG. 3. FIG. 3 is an example of a density histogram of a negative film on which a picture image is recorded. The extent of a histogram generally varies greatly depending on the content of a picture. However, if an appropriate range of γ value upon printing and reproducing density range of a print material are considered, the density range which can be used for printing will be limited as shown by range 5 in FIG. 3, for example.

In this case, it is possible that an area in the shade becomes too dark in density range 6, or an area in bright light becomes too bright in density range 7. The allowance of these phenomena depends on the intention of the photographer, and even when an operator of a picture printer judges it to be allowable, the photographer may request a reprint. Therefore, the range 5 to be used for printing needs to be changed (translated parallel) in accordance with this request. In the present method, a larger range 8 is stored as the picture image data, in consideration of such a possible change in the print density range upon reprinting.

It is preferable for the tag information showing the density range used for a first print (for example, the lower limit and the upper limit of the density range) to be added to the picture image data and stored with the picture image data. When the picture image data are reprinted, the stored picture image data are displayed on a monitor, after tone correction which is the same as in the previous printing is carried out thereon using the tag information. An operator inputs density correction into the system while looking at the monitor, and the system displays the picture image data on the monitor after the tone correction processing has been carried out on the picture image data with the shifted density range in accordance with the density correction having been input. The picture image data are printed with the density range finally determined as the print density range by such an adjustment.

A third method of the present invention for storing the picture image data for a reprint reads image data at as high a resolution as possible, regardless of the resolution requested for first time printing, and the high resolution image data are stored so that picture quality deterioration due to an insufficient information amount will not occur, regardless of the resolution required upon reprinting. However, to generate low resolution image data from the high resolution image data, predetermined processing is necessary. Therefore, it is preferable that several sets of picture image data at several resolutions are generated in advance and stored. Among the picture image data whose resolution is higher than the requested resolution upon reprinting, the image data at the resolution closest to the requested one will be used for a reprint. In this manner, the time required for access to the picture image data, pixel number conversion processing, and the like, will be shortened.

It is preferable that picture image data display is carried out at the resolution in accordance with the resolution of the monitor screen. Therefore, picture image data at the resolution of the monitor resolution may be stored separately. In the third storing method, if the resolution for the first time printing is also stored as the tag information with the image data and displayed on the monitor, the information can be referred to when the resolution for a reprint is determined.

Although the first, second and the third storing methods of the present invention have been respectively described above, it is preferable that these methods are used in combination as required.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method, comprising the steps of:
    obtaining picture image data representing a picture image recorded on a developed film by reading an image reading area relatively greater than a typical print area, including almost an entire area of the picture image on the film;
    storing the obtained picture image data in a recording medium;
    designating an area for printing which is smaller than the image reading area; and
    generating a picture print from picture image data of the designated area.

2. A method as defined in claim 1 wherein tag information, indicating the typical print image area, is stored with the picture image data in the recording medium.

3. A method, comprising the steps of:
    obtaining picture image data representing a picture image recorded on a developed film by reading the picture image on the film over an input density range relatively greater than a typical film density range, including nearly an entire density range of the picture image;
    storing the obtained picture image data in a recording medium;

designating a density range for printing which is narrower than the input density range; and generating a picture print from the picture image data of the designated a predetermined density range.

4. A method as defined in claim 3 wherein tag information indicating the designated print density range, is stored with the picture image data in the recording medium.

5. A method comprising the steps of:

obtaining picture image data representing a picture image recorded on a developed film by reading the picture image on the film at a predetermined resolution, relatively greater than a typical resolution;

storing the obtained picture image data in a recording medium;

designating a resolution for printing, relatively less than the predetermined resolution; and generating a picture print from the picture image data at the designated resolution.

6. A method as defined in claim 5 wherein tag information indicating the designated resolution of the picture print, is stored with the picture image data in the recording medium.

7. A method as defined in claim 5 or 6, wherein at least one set of image data of the picture image, classified by a resolution lower than the predetermined resolution, are stored with the picture image data in the recording medium.

8. A system, comprising:

image reader adapted to obtain picture image data representing a picture image recorded on a developed film by reading an image reading area relatively greater than a typical print area, including almost an entire area of the picture image on the film;

a recording medium adapted to store the obtained picture image data;

a designation device, adapted to designate an area for printing which is smaller than the image reading area; and a picture printer for generating a picture print from the picture image data of the designated area.

9. A system as defined in claim 8 wherein the recording medium stores tag information indicating the designated print image area, with the image data.

10. A system comprising:

image reader, adapted to obtain picture image data representing a picture image recorded on a developed film by reading the picture image on the film over an input density range relatively greater than a typical film density range, including nearly an entire density range of the picture image;

a recording medium, adapted to store the obtained picture image data;

a designating device, adapted to designate a density range for printing which is narrower than the input density image; and a picture printer for generating a picture print from the picture image data of the designated density range.

11. A system as defined in claim 10, wherein the recording medium stores tag information indicating the designated print density range with the picture image data.

12. A system comprising:

an image reader, adapted to obtain picture image data representing a picture image recorded on a developed film by reading the picture image on the film at a predetermined resolution, relatively greater than a typical resolution;

a recording medium adapted to store the obtained picture image data;

a designating device, adapted to designate a resolution for printing, relatively less than the predetermined resolution; and a picture printer for generating a picture print from the picture image data at the designated resolution.

13. A system as defined in claim 12 wherein the recording medium stores tag information indicating the designated resolution of the picture print with the image data.

14. A system as defined in claim 12 or 13, wherein at least one set of image data of the picture image, classified by a resolution lower than the predetermined resolution, are stored with the picture image data.

15. The method of claim 1, further comprising:

displaying the stored picture image data, the display including a typical print area of the image data and image data outside of the typical print area.

16. The method of claim 3, further comprising:

displaying the stored picture image data, the display including a typical film density range and a film density range outside of the typical range.

17. The method of claim 5, further comprising:

displaying the stored picture image data, the display including the predetermined resolution and a resolution less than the predetermined resolution.

18. A method, comprising:

scanning an area of film, relatively greater than a typical print area, to generate image data;

storing the generated image data;

displaying the stored image data, the display including a typical print area of the image data and including image data outside the typical print area;

selecting a portion of the displayed image data for printing, wherein image data outside of the typical print area is selectable.

19. The method of claim 18, wherein the scanning step scans an area of film relatively enlarged in a film feeding direction.

20. The method of claim 18, wherein the scanning includes recognizing an area of an image on the film and scanning an area relatively larger than the recognized area.

21. The method of claim 20, wherein the scanned area is relatively larger in the film feeding direction.

22. The method of claim 21, wherein the scanned area is also relatively larger in an area perpendicular to the film feeding direction.

23. The method of claim 18, further comprising:

printing the selected portion.

24. The method of claim 18, wherein tag information, representing the typical print area, is stored with the generated image data.

25. The method of claim 24, wherein the tag information is used to display the typical print area.

26. The method of claim 1, wherein the obtaining step includes reading an image reading area of film relatively enlarged in a film feeding direction.

27. The method of claim 1, wherein the obtaining step includes recognizing an area of an image on the film and reading an area relatively larger than the recognized area.

28. The system of claim 8, wherein the image reader is adapted to read an image reading area of film relatively enlarged in a film feeding direction.

29. The system of claim 8, wherein the image reader is adapted to recognize an area of an image on the film and read an area relatively larger than the recognized area.

* * * * *